(12) United States Patent
Dieterman

(10) Patent No.: US 6,393,464 B1
(45) Date of Patent: May 21, 2002

(54) METHOD FOR CONTROLLING THE DELIVERY OF ELECTRONIC MAIL MESSAGES

(75) Inventor: Jude Gerard Dieterman, Naperville, IL (US)

(73) Assignee: Unbound Communications, Inc., Wheeling, IL (US)

(*) Notice: Subject to any disclaimer, the term of this patent is extended or adjusted under 35 U.S.C. 154(b) by 0 days.

(21) Appl. No.: 09/309,219

(22) Filed: Jun. 10, 1999

(51) Int. Cl.[7] .......................... G06F 15/16; G06F 15/173
(52) U.S. Cl. ........................................ 709/206; 713/200
(58) Field of Search ................................ 709/206, 227, 709/229, 245, 202, 203, 204; 713/200, 201

(56) References Cited

U.S. PATENT DOCUMENTS

| | | | | |
|---|---|---|---|---|
| 5,619,648 A | * | 4/1997 | Canale et al. | 709/206 |
| 5,835,722 A | * | 11/1998 | Bradshaw et al. | 713/201 |
| 5,999,932 A | * | 12/1999 | Paul | 709/206 |
| 5,999,967 A | * | 12/1999 | Sundsted | 709/206 |
| 6,023,723 A | * | 2/2000 | McCormick et al. | 709/206 |
| 6,052,709 A | * | 4/2000 | Paul | 709/204 |
| 6,112,227 A | * | 8/2000 | Heiner | 709/206 |

OTHER PUBLICATIONS

Venditto, G.; "Safe Computing"; Internet World, Sep. 1996 v7 n9 p48(10).*

* cited by examiner

*Primary Examiner*—Mark H. Rinehart
*Assistant Examiner*—Marc D. Thompson
(74) *Attorney, Agent, or Firm*—Dick & Harris (57) ABSTRACT

The present disclosure discloses a method for controlling the delivery of electronic mail. The method comprises the steps of: creating an allowed list of electronic addresses with which the user is permitted to freely exchange messages; categorizing as authorized each message that is sent to or received from an entity whose address is included on the list; categorizing as unauthorized each message that is sent to or received from an entity whose electronic address is not included in the list; transmitting authorized outgoing messages to their intended recipients; allowing the user to access the contents of authorized received messages. Also disclosed is a method for allowing an administrator to selectively approve messages which are sent to or received from entities whose electronic addresses do not appear on the allowed list.

12 Claims, 8 Drawing Sheets

METHOD FOR CONTROLLING THE DELIVERY OF ELECTRONIC MAIL MESSAGES

BACKGROUND OF THE INVENTION

1. Field of the Invention

The present invention relates in general to communication between computers over the internet and in particular, to a method for controlling the delivery of electronic messages.

2. Background Art

As access to the internet has increased dramatically in recent years, almost anyone with a computer can communicate with other computer users to send and receive messages, to transfer files between computers and perform many other interactive processes. While the internet becomes increasingly integrated into modern society, it has remained and is expected to remain a largely uncensored medium for information exchange.

In many households and classrooms children are being provided with access to personal computers, with younger and younger children encouraged to learn to use personal computers. Children are using computers to not only run stand-alone educational and entertainment application programs, but also to access information available on other computers and to send and receive electronic messages via the internet. In many cases children's use of such computers is unsupervised. While unsupervised use of a stand-alone computer program may be of little concern, the use of the computer to communicate with others over the internet is becoming an important issue for many parents and guardians since the internet affords the child the opportunity to communicate with others unknown to the parent or guardian.

Consequently, parents of younger children are often faced with the dilemma of whether or not to allow their children access to a computer which has a connection to the internet. While it is valuable for children to learn to use computers at an early stage in their lives, unrestricted communication with others over the internet can expose children to harmful or dangerous information and negative influences.

Accordingly, while there is a need to allow children to become familiar with and use the many resources accessible over the internet, such as e-mail used to communicate with their peers, there is also a need to restrict communication with other unwanted persons. It is therefore an object of this invention to provide a method by which parents can allow their children to use a computer connected to the internet while simultaneously controlling the audience with whom the child communicates.

It is a further object of the present invention to prevent an electronic message from being sent by a child to an intended recipient who has not been approved by a parent or guardian.

It is another object of the present invention to prevent a child from reading an electronic message received from a sender who has not been approved by a parent or guardian.

These and other objects of the present invention will become apparent in light the present specification and drawings.

SUMMARY OF THE INVENTION

The present invention comprises a method for controlling the delivery of electronic messages sent to and sent by a user. The user's communications can be controlled by an administrator. The user referred to in the embodiment illustrated will generally be a child with the administrator commonly being the child's parent or guardian.

The method utilizes a list of allowed electronic addresses with whom the user is permitted to freely exchange messages. Each message sent by or sent to the user will be categorized as either authorized if the other party to the communication appears on the allowed list, or unauthorized if the other party does not appear on the allowed list. Outgoing messages which are authorized will be transmitted to their destination, and incoming messages which are authorized can be opened and viewed by the user. Outgoing messages which are not authorized will not be transmitted, but rather will be held. The user will receive an indication that the administrator must approve the e-mail before it will be sent. Once the outgoing e-mail is approved it can be transmitted. Similarly, incoming e-mails which are not sent by an entity whose address appears in the list of allowed addresses, cannot be opened or read by the user. The user will be prompted to seek approval of the incoming message from the administer. Once the administrator approves the incoming message with a password, the user can then open and view the message contents.

Specifically, the present invention comprises a method for controlling the delivery of electronic messages sent to and sent by a user. Specifically, the method comprises the steps of: creating an allowed list comprised of electronic entity identifications with whom the user is permitted to freely exchange messages; categorizing as authorized each outgoing and incoming message that is sent to and received from an entity whose electronic identification is included on the allowed list; categorizing as unauthorized each outgoing and incoming message that is sent to and received from an entity whose electronic identification is not included in the allowed list; transmitting only authorized outgoing messages to their intended recipients; and allowing the user to access the contents of authorized received messages. A preferred embodiment of the present invention includes the further steps of: requesting authorization for each unauthorized incoming and outgoing messages; and authorizing the delivery or viewing of each message sent to or received from an electronic identification that does not appear on the allowed list.

As discussed hereinbelow, these methods have applications to numerous situations and are only limited as indicated by the claims appended hereto.

DETAILED DESCRIPTION OF THE DRAWINGS

While this invention is susceptible to embodiment in many forms, there is shown in the drawings and will herein be described in detail specific embodiments, with the understanding that the present disclosure is to be considered as an exemplification of the principles of the invention and is not intended to limit the invention to embodiments illustrated.

Figure 1:
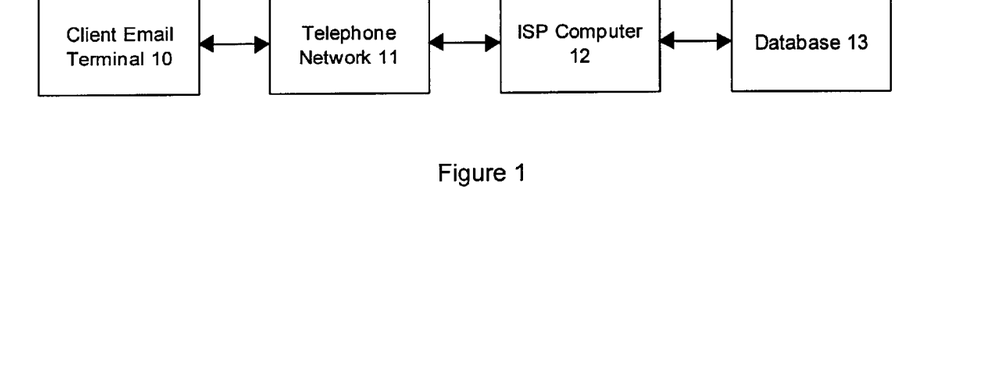
FIG. 1 of the drawings is a block diagram illustration of the communication between a Client Email Terminal and an ISP Server, via the telephone network.

The present invention comprises a method for controlling the delivery of electronic messages, commonly referred to as "email", sent from and received by a user using a client email terminal which is placed in momentary communication with an internet service provider ("ISP"). Client email terminal 10 is shown in FIG. 1 as communicating with ISP computer 12 via telephone network 11. ISP computer 12 serves to route email messages between client email terminal 10 and other entities via the internet. While the user device is referred to herein as a client email terminal, such device can comprise virtually any single or multipurpose microprocessor based computing device capable of establishing communication with an ISP, including a personal computer.

According to the present invention, the sending of email messages by a user and the viewing of email messages received by a user are controlled by an account administrator who establishes and maintains a list of allowed senders and recipients of email messages. The list may reside in a database within client email terminal 10 and in database 13 which is accessible to ISP computer 12. In the primary embodiment described herein, the user is typically a child having an email account established with the ISP and a corresponding email address. The account administrator is typically the child's parent or guardian. However, the invention is not restricted to this application and, indeed, can be utilized wherever it is desired to provide a user with restricted access to computer network communication.

Figure 2:
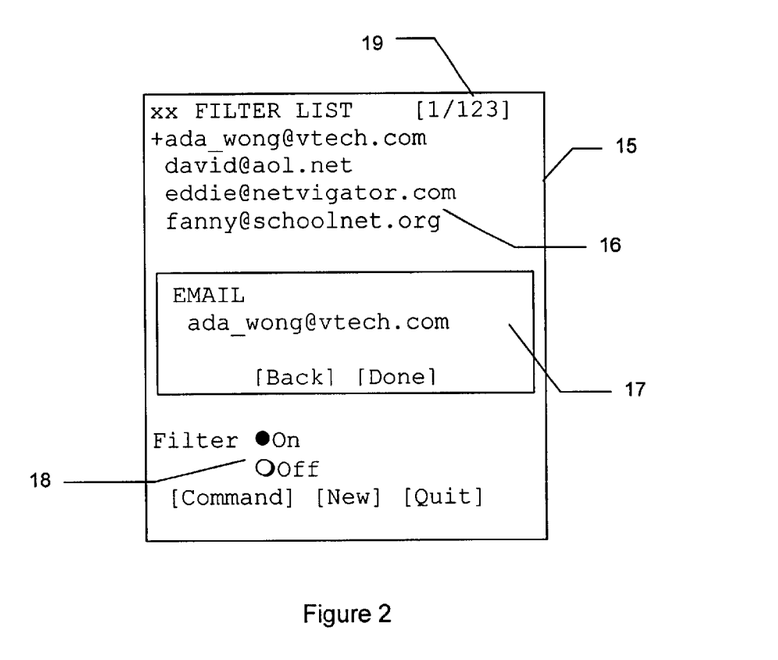
FIG. 2 of the drawings is an illustration of one embodiment of a client email terminal device screen display which allows an administrator to create, view and edit a list of allowed email addresses with whom the user may exchange email messages.

The invention prevents communications between a user and entities who do not appear on an "allowed list." The allowed list is typically created by an account administrator and contains the identifications of entities with which the user is permitted to communicate freely. FIG. 2 depicts a sample email terminal screen display 15 on which the administrator may view the content of the allowed list and add, delete and edit the identities of entities appearing on the allowed list. The embodiment of FIG. 2 is directed specifically to email messaging, and the entity identifications are shown consisting of email addresses containing the now well known "@" symbol. However, electronic entity identifications can include any identifying means by which another party can be communicated with. For example, electronic identity identifications may also include web site Universal Resource Locations for communications in a web-based system, or TCP/IP addresses used in, for example, video conferencing communications.

Screen display 15 illustrates the user interface for adding, deleting and editing email addresses. In the example illustrated, the list 16 of allowed addresses comprises 123 names as indicated by counter 19. The adding or editing of email addresses is performed via dialog box 17. The allowed list may be selectively enabled and disabled by software switch 18.

In the present invention it may be desirable to have shorthand or "nicknames" appear on the allowed list as opposed to the conventional email addresses. This may be particularly convenient for children and parents alike given a child's likelihood to adopt an email nickname as a substitute for the child's given name.

Figure 3:
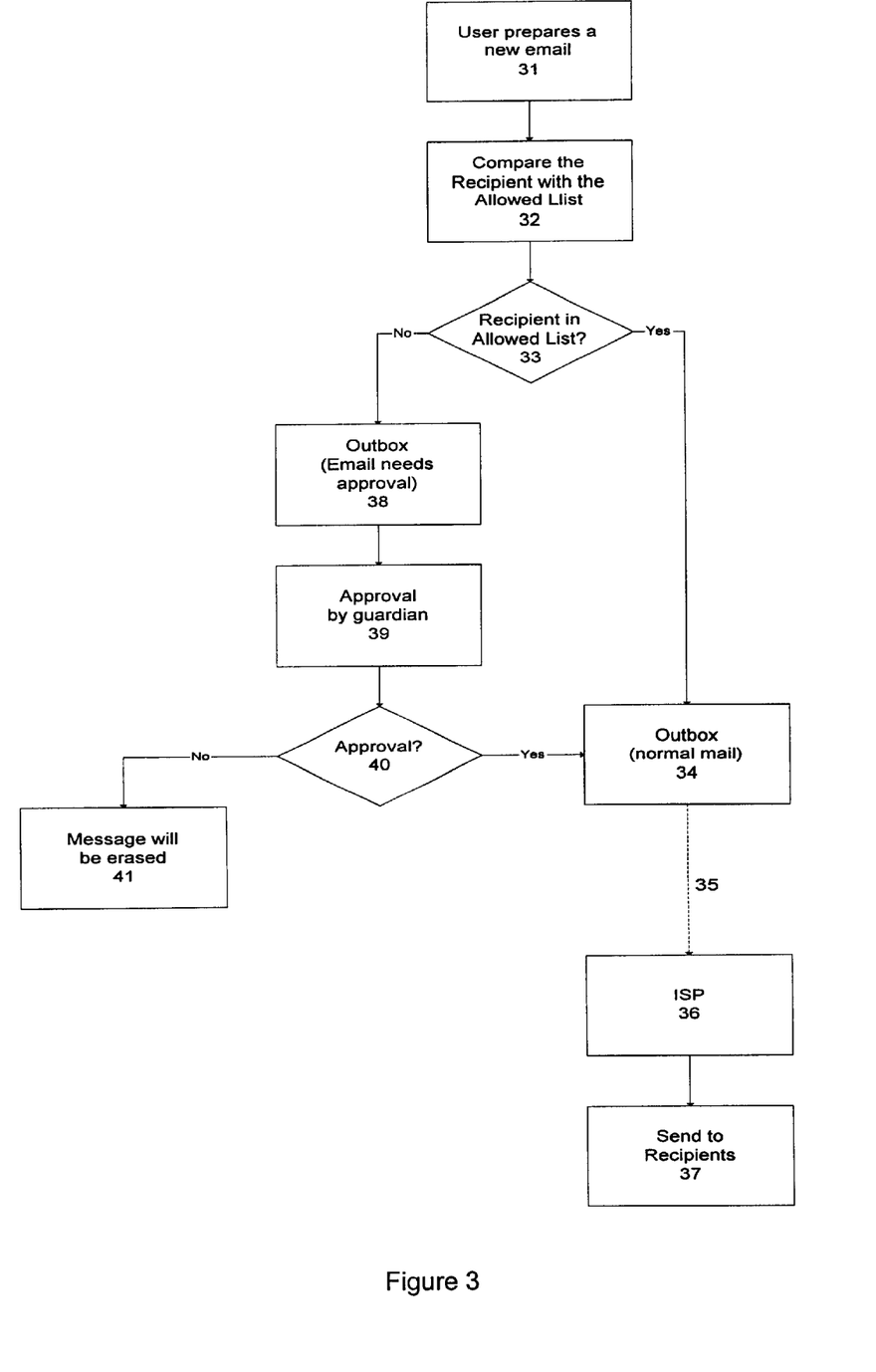
FIG. 3 of the drawings is a flowchart depicting one method of controlling the sending of outgoing email messages created by the user.

FIG. 3 contains a flow chart illustrating the various steps which comprise the method of one embodiment of the invention. Specifically, the method prevents a user from sending an email message to a recipient whose email address does not appear on the allowed list. The method uses as a metaphor multiple outboxes for holding email messages to be sent to their intended recipients where one outbox consists of messages directed to recipients appearing on the allowed list, and another outbox consists of messages whose recipients are not on the allowed list.

Figure 7:
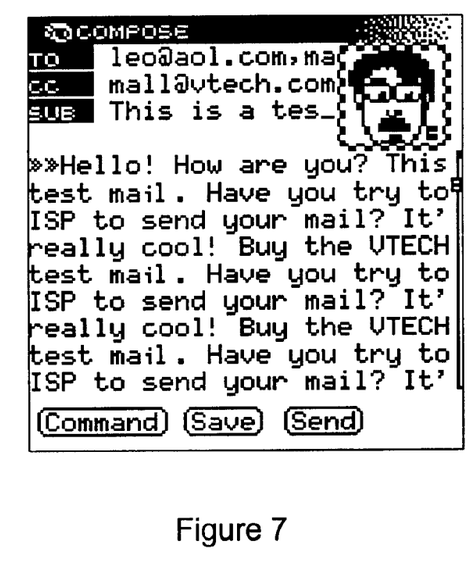
FIG. 7 of the drawings is an illustration of a sample screen display of the email message composition screen.

The process of sending an email message 30 begins with the user composing the email message, step 31. A sample screen display illustrating the user interface provided to compose an email message is shown in FIG. 7. Once the user has completed composing an email message it may be saved as a draft for later editing or it may be designated as ready to be sent. Once designated as ready for sending, the identity of each recipient of the email message prepared by the user is compared to the allowed list, step 32. If the all of the recipients are on the allowed list, step 33, the email message is placed in the normal mail outbox, step 34. When the next connection with the ISP is made, step 35, all messages in the normal mail outbox are sent onto the internet, step 37.

Figure 8:
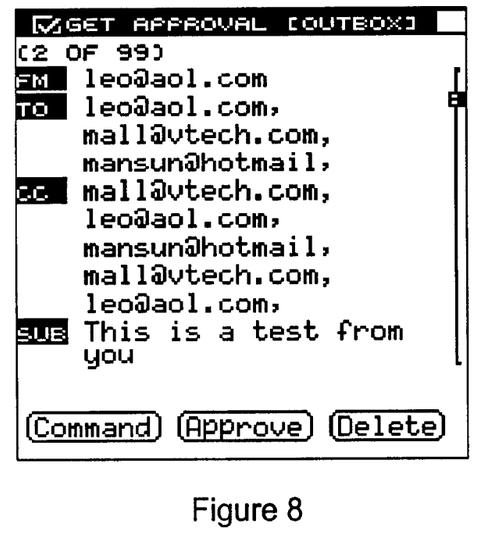
FIG. 8 of the drawings is an illustration of a sample screen display of the approval of a message in the user's outbox.

If, however, when performing the comparison between each named recipient and the contents of the allowed list it is determined that not all recipients are in fact on the allowed list, step 33, then the email message is placed in an alternate outbox designated for messages that require administrator approval before being sent, step 38. If an email message is approved by the administrator, step 40, the email is moved to the normal outbox, step 34, for sending upon the next connection to the ISP. If the email however is not approved by the administrator, it will remain in the outbox for emails needing approval and will be erased after a predetermined amount of time if no approval has been granted, step 41. The process of administrator approval typically involves an administrator entering some type of password or authentication code. A sample email terminal screen display of the administrator approval step 40 appears in FIG. 8.

The foregoing steps depict a process performed by one embodiment of the present invention. Given that the process is performed by software resident within the email terminal and ISP server, it is understood that steps may be consolidated or expanded without departing from the scope of the present invention.

Figure 4:
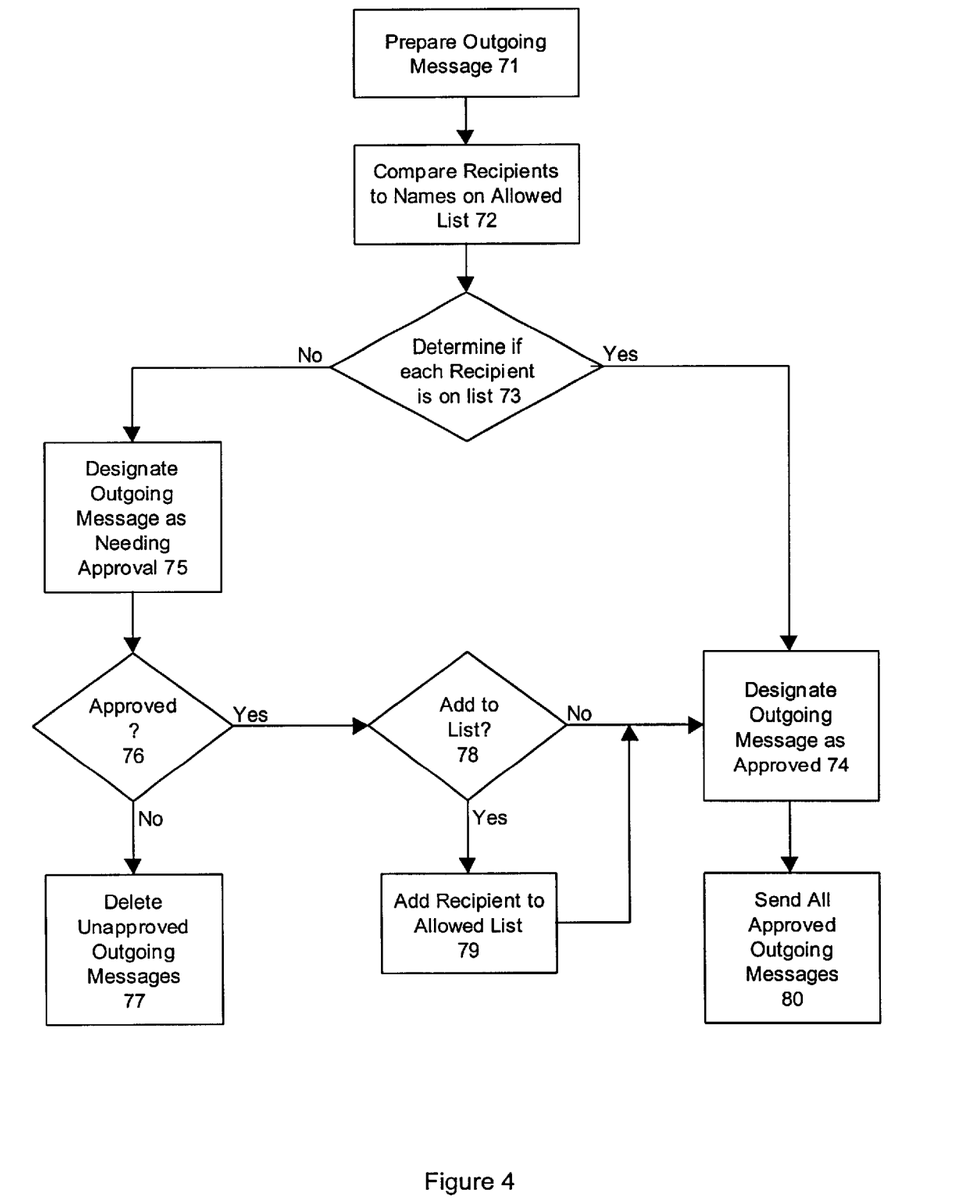
FIG. 4 of the drawings is a flowchart depicting an alternative embodiment of the method of controlling the sending of outgoing email messages from a client email terminal.
Figure 9:
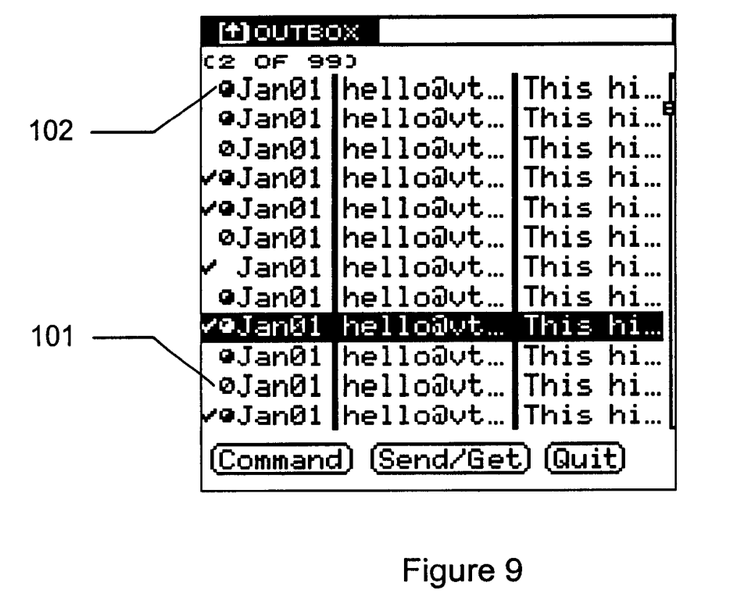
FIG. 9 of the drawings is an illustration of a sample screen display of the user's outbox.

In another embodiment of the invention, as illustrated in FIG. 4, an outgoing message may not be "moved" from one "outbox" to another, but instead may "reside" within a single outbox or database list with each message therein having a status flag set or not set to indicate whether each message is approved or not. A sample email terminal screen display of such an outbox appears in FIG. 9. In this embodiment, an outgoing message is prepared by the user, step 71, as depicted in the email terminal screen display of FIG. 7. Thereafter, the recipients of the outgoing message are compared to the identities appearing on the allowed list, step 72, and a determination is made whether each designated recipient is on the list, step 73. If all are on the allowed list, the message is designated as approved, step 74. If any recipients are determined not to be on the allowed list the outgoing message is designated as needing approval, step 75. Messages requiring approval appear in the outbox of FIG. 9 marked with icon 101, consisting of a circle with a slash through it, to the left of the message date. If approval for a message is thereafter given by the account administrator in step 76, the administrator is further given the option, step 78, to add the approved recipient to the allowed list such that subsequent messages to the recipient will not require administrator action, step 79. Whether or not a recipient is added to the allowed list, the message is designated as approved, step 74, and the icon marking the message in the outbox changes to half-filled circle 102, indicating to the user that approval is no longer required. If no approval is given in step 76, messages designated as needing approval are deleted at predetermined intervals, step 77. When the email terminal is connected to the ISP, all messages designated as approved are transmitted to the ISP and sent to the intended recipients, step 80.

Figure 5:
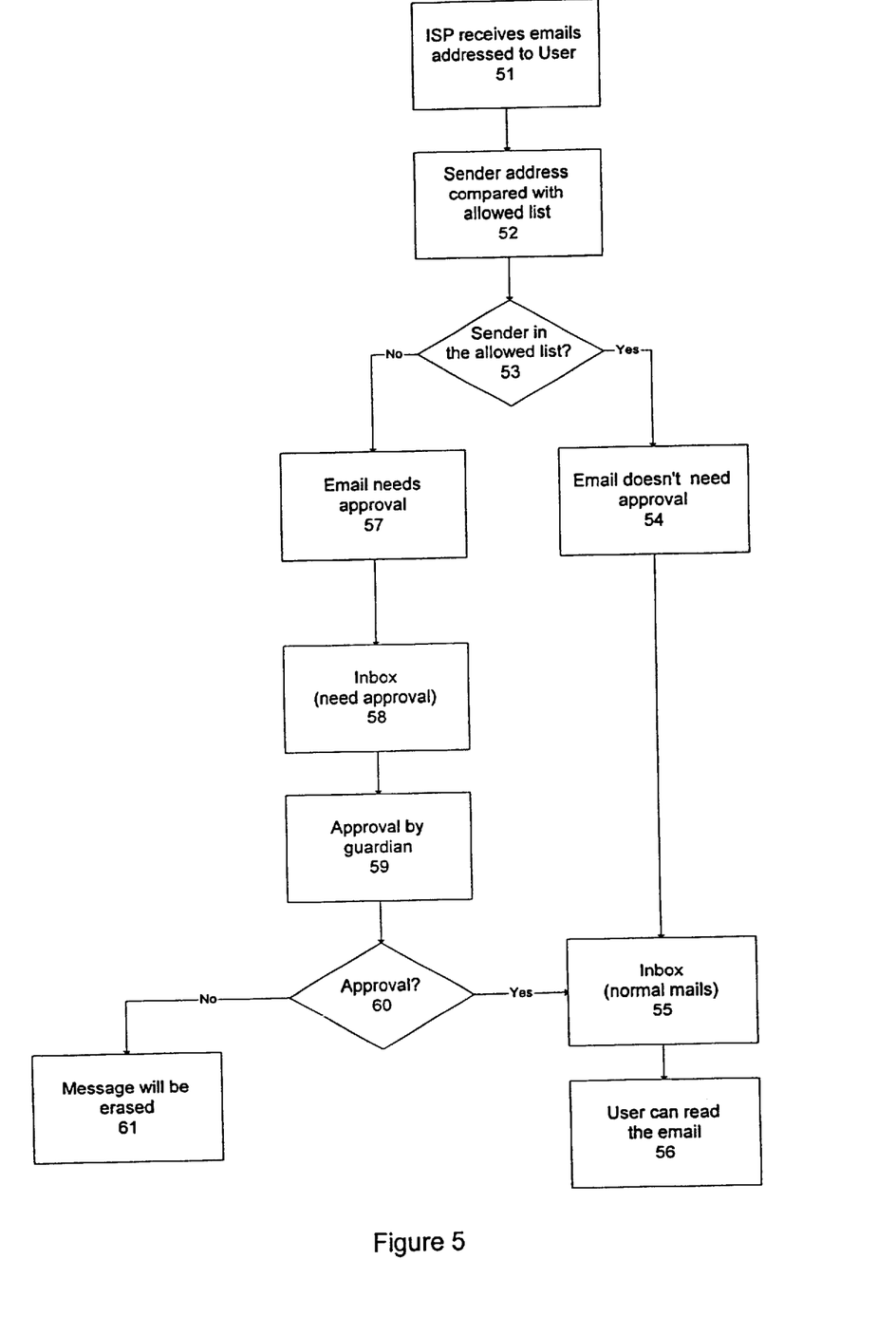
FIG. 5 of the drawings is a flowchart depicting one method of controlling the viewing of incoming email messages received by the user of the client email terminal.
Figure 11:
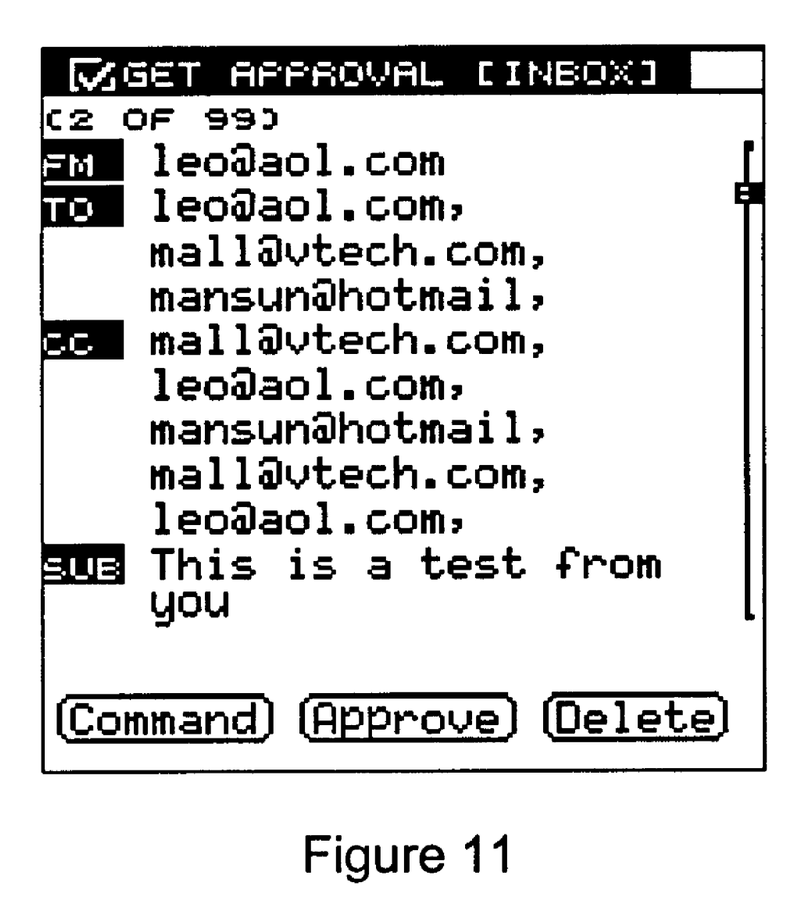
FIG. 11 of the drawings is an illustration of a sample screen display of the approval of a message in the user's inbox.

FIG. 5 of the drawings illustrates the method of the present invention by which a user receives incoming email messages. As before, a metaphor of multiple incoming email boxes is adopted. In the present invention, all email messages addressed to the user are transferred by the ISP to the user's email terminal each time the terminal is connected to the ISP server, step 51. The identity of the sender of each incoming email message is compared to identities appearing on the allowed list, step 52. If the sender is determined to be in the allowed list, step 53, the incoming message is designated as a message which does not require approval, step 54, and is in turn, placed in the normal mail inbox, step 55. If the identity of the sender of an email is determined to not appear on the allowed list, step 53, the incoming message is designated as a message which requires approval, step 57, and is placed in the inbox for messages requiring approval, step 58. An administrator thereafter may approve each such message, step 59. FIG. 11 depicts a sample email terminal screen display of administrator approval step 59. If approval is granted, step 60, the email message is placed in the normal inbox, step 55. If approval is not given, step 60, the message will be deleted after a predetermined amount of time, step 61.

The foregoing steps depict a process performed by one embodiment of the present invention. Given that the process is performed by software resident within the email terminal, it is understood that steps may be consolidated or expanded without departing from the scope of the present invention.

Figure 6:
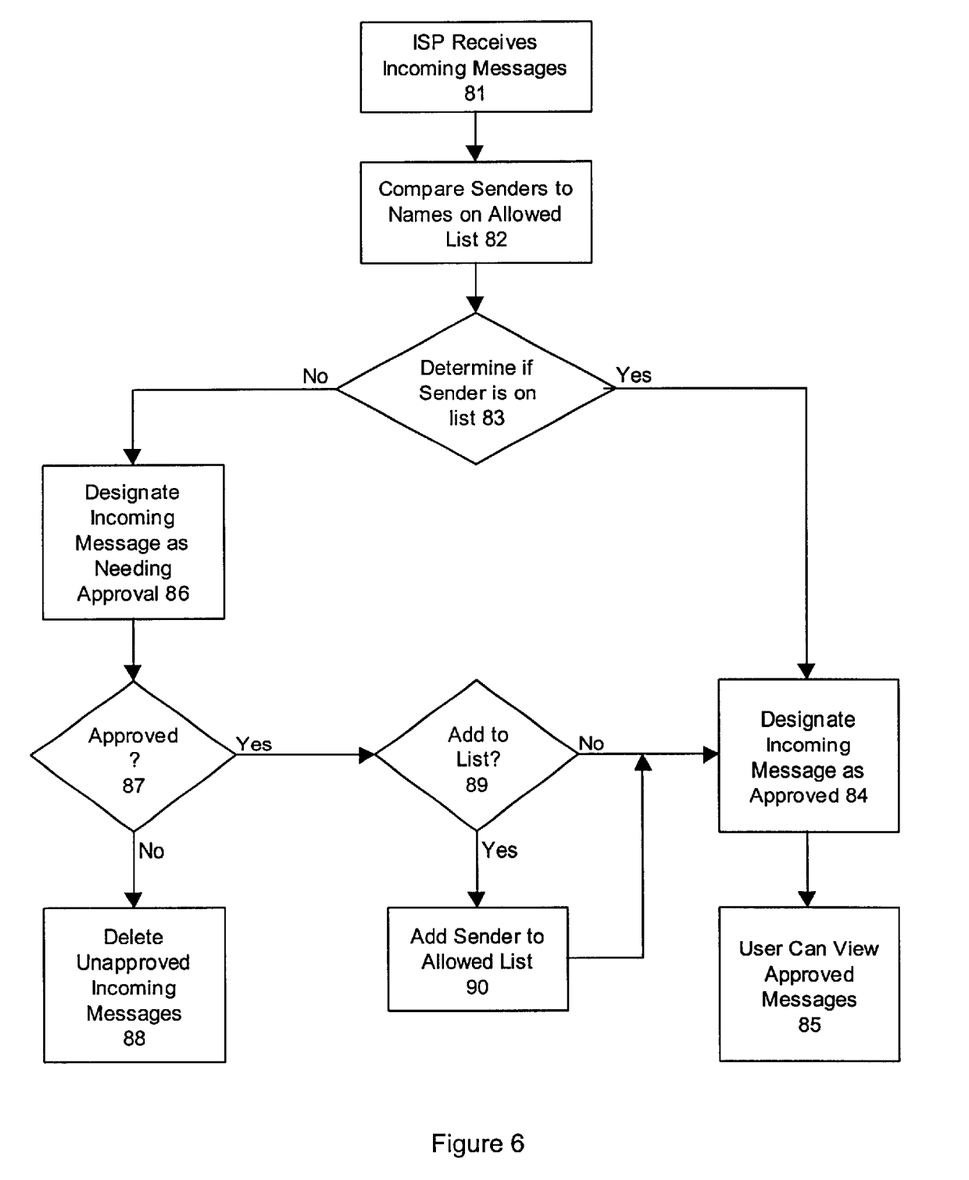
FIG. 6 of the drawings is a flowchart depicting an alternative embodiment of the method of controlling the viewing of incoming email messages received by the user of the client email terminal.

In another embodiment of the invention, as illustrated in FIG. 6, an incoming message is not "moved" from one "outbox" to another, but instead may "reside" within a single inbox or database list with each message therein having a status flag set or not set to indicate whether each message is approved for viewing by the user or not, as described for steps 84 and 86 below.

Figure 10:
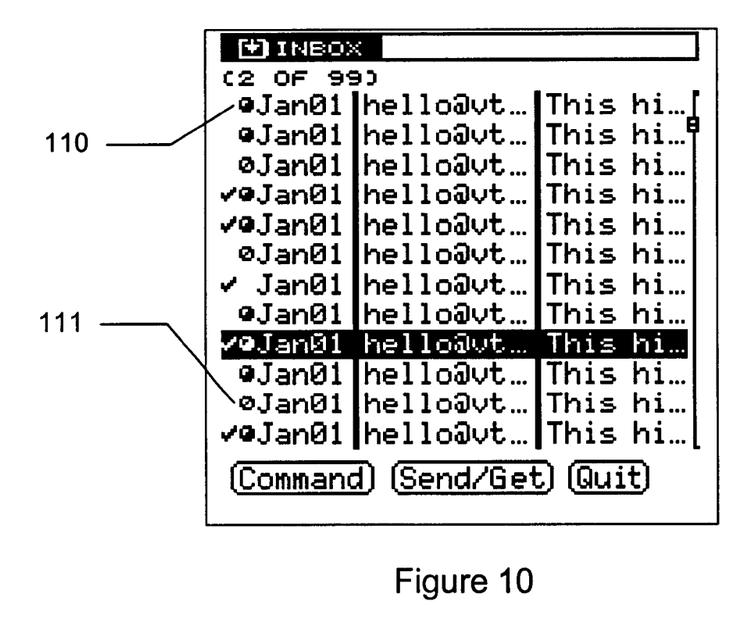
FIG. 10 of the drawings is an illustration of a sample screen display of the user's inbox.

FIG. 10 depicts a sample email terminal display of such an inbox. In this embodiment all incoming messages addressed to the user are received by the user's email terminal, step 81. Thereafter, the sender of each incoming message is compared to the identities appearing on the allowed list, step 82, and a determination is made whether the sender is on the list, step 83. If the sender is on the allowed list the message is designated as approved for viewing by the user, step 84, and marked with half-filled circle icon 110, indicating that the message remains unread. If a sender is determined not to be on the allowed list the incoming message is designated as needing approval for viewing, step 85. A message requiring approval is marked with the circle with slash icon 111 in the inbox of FIG. 10. If approval is thereafter given by the account administrator in step 87, the administrator is further given the option in step 89 to add the message sender to the allowed list, step 90, such that subsequently received messages from the sender will not require administrator approval. Whether or not the sender is added to the allowed list, the incoming message is designated as approved for viewing, step 84, and the inbox marking icon is changed to a half-filled circle. If no approval is given by the administrator, messages designated as needing approval for viewing are deleted at predetermined intervals in step 88. Incoming email messages designated as approved for viewing are thus able to be viewed by the user.

As an alternative to the foregoing embodiment of the present invention, the comparison between the sender's address and the allowed list may be performed by the ISP computer instead of by the client email terminal. In such an embodiment, only those email messages from senders whose addresses appear on the allowed list maintained by the ISP computer are communicated to the client email terminal. Such an embodiment has the advantage of off-loading the processing overhead incurred in making the comparisons to the ISP's computers, which tend to be substantially more powerful and able to handle the processing tasks.

A requisite component of such an alternative embodiment requires that a copy of the current allowed list for each client email terminal user be maintained on the ISP computer system. Accordingly, a copy of the allowed list maintained on the client computer is transferred to the ISP computer during each session where the client email terminal is connected to the ISP computer so that the ISP computer is always synchronized with the client's allowed list.

In another embodiment in which the allowed list is maintained on both the client email terminal and the ISP, the client email terminal transmits changes that have been made to the client allowed list since the previous ISP connection. The ISP also transmits changes that have been made to the ISP allowed list since the previous connection. Such an embodiment allows changes to be made by either side. This embodiment can be advantageous if the ISP establishes an internet web site that an administrator can utilize to remotely control the allowed list, as well as previously-described control at the client email terminal. For example, a parent at work can use any computer with internet access to add, delete, or change the list people with whom their child can communicate. Those changes would become effective as soon as the child connects with the ISP.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

I claim:

1. A method for controlling the delivery of electronic messages sent to and sent by a user, said method comprising the following steps:

creating an allowed list comprised of electronic entity identifications with whom the user is permitted to freely exchange messages;

categorizing as authorized each outgoing and incoming message that is sent to and received from an entity whose electronic identification is included on the allowed list;

categorizing as unauthorized each outgoing and incoming message that is sent to and received from an entity whose electronic identification is not included in the allowed list;

transmitting only authorized outgoing messages to their intended recipients;

allowing the user to access the contents of authorized received messages;

requesting authorization for each unauthorized incoming and outgoing messages;

authorizing the delivery or viewing of each message sent to or received from an electronic identification that does not appear on the allowed list.

2. A method for permitting an administrator to control reception of electronic messages by a user of a client terminal, which client terminal connects to a computer network through a service provider, the method consisting of the following steps:

creating an allowed list of electronic entity identifications from which the user is permitted to receive messages;

receiving at the service provider one or more electronic messages addressed to the user;

establishing a communications link between the service provider and the client;

determining for each of the electronic messages addressed to the user whether or not the sender's electronic identification appears in the allowed list;

transmitting all messages to the client computer;

allowing the user to display the contents of each message received from an entity whose electronic identification appears in the allowed list;

preventing the user from displaying the contents of each message received from an entity whose electronic identification does not appear in the allowed list;

authorizing the reception of a message from a sender whose electronic identification does not appear in the allowed list;

allowing the user to display the contents of the authorized message.

3. The method of claim 2, in which the step of determining whether or not the sender's electronic identification appears in the allowed list is performed by the service provider.

4. The method of claim 2, in which the step of determining whether or not the sender's electronic identification appears in the allowed list is performed by the client terminal.

5. A method for permitting an administrator to control the transmission of electronic messages by a user of a client terminal, which client terminal connects to a computer network through a service provider, the method consisting of the following steps:

creating an allowed list of electronic entity identifications to which the user is permitted to transmit messages;

generating one or more outgoing electronic messages for transmission to a destination electronic entity identification;

establishing a communications link between the service provider and the client;

determining for each of the outgoing electronic messages whether or not the message's destination identification appears in the allowed list;

transmitting all messages directed to a destination identification which appears in the allowed list;

authorizing the transmission of a message to a destination identification that does not appear in the allowed list;

transmitting the authorized message to its intended destination.

6. A method for permitting an administrator to control the transmission of an electronic message from a user's computer to an electronic destination identification, which method is comprised of the following steps:

creating an allowed list of electronic entity identifications to which the user is permitted to transmit messages;

generating an electronic message;

determining whether or not the message's destination electronic identification appears in the allowed list;

transmitting the message if its destination electronic identification appears in the allowed list;

authorizing the transmission of a message to a destination identification that does not appear in the allowed list;

transmitting the authorized message.

7. A method for permitting an administrator to control the reception of electronic messages by a user's computer from a sender's computer, which method is comprised of the following steps:

creating an allowed list of electronic entity identifications from which the user is permitted to receive messages;

receiving an electronic message;

determining whether or not the electronic entity identification of the message sender appears in the allowed list;

permitting the user to access the contents of the message only if the sender's electronic identification apears in the allowed list;

authorizing the message received from a sender whose electronic identification does not appear in the allowed list;

permitting the user to access the contents of the authorized message.

8. A method for controlling the delivery of electronic messages sent to and sent by a first user by a second user, said method comprising the following steps:

creating an allowed list comprised of electronic entity identifications with whom the first user is permitted to freely exchange messages;

categorizing as authorized each outgoing and incoming message that is sent to and received from an entity whose electronic identification is included on the allowed list;

categorizing as unauthorized each outgoing and incoming message that is sent to and received from an entity whose electronic identification is not included in the allowed list;

requesting authorization for each unauthorized incoming and outgoing messages;

changing the status of a message from unauthorized to authorized by the second user;

transmitting only authorized outgoing messages to their intended recipients;

allowing the first user to access the contents of authorized received messages only.

9. The method of claim 8, in which the step of requesting authorization for each unauthorized incoming and outgoing message further comprises the substep of delivering the unauthorized message to an approval mailbox to which the second user has access and the first user does not have access; and the step of allowing the first user to access the contents of authorized received messages further comprises the substep of transmitting messages in the approval mailbox to a mailbox accessible to the first user.

10. The method of claim 8, in which the step of changing the status of a message is further comprised of the following substeps:

selecting the message for which the status is to be changed;

entering by the second user a password unknown to the first user;

designating the message as authorized if the password entered by the second user corresponds to a predetermined authorization password.

11. The method of claim 5, in which the step of authorizing the transmission of a message is further comprised of the substeps of:

delivering a message directed to a destination identification which does not appear in the allowed list to a destination accessible to the administrator but not accessible to the user;

approving the transmission of the message to its intended destination address by the administrator;

transmitting the message to its intended destination address.

12. The method of claim 5, in which the step of authorizing the transmission of a message is further comprised of the substeps of:

requesting authorization of a message directed to a destination that does not appear on the approved list;

entering by the administrator a password unknown to the user;

designating the message as authorized if the password entered by the administrator corresponds to a predetermined authorization password.

* * * * *